United States Patent Office 3,676,301
Patented July 11, 1972

3,676,301
PROCESS FOR PREPARING L-HISTIDINE
Junichi Nakajima, Kazumi Araki, and Kenzo Morinaga, Hofu, Japan, assignors to Kyowa Hakko Kogyo Kabushiki Kaisha, Tokyo-to, Japan
No Drawing. Filed Apr. 9, 1970, Ser. No. 27,141
Claims priority, application Japan, Apr. 10, 1969, 44/27,270
Int. Cl. C12d 13/06
U.S. Cl. 195—29       5 Claims

ABSTRACT OF THE DISCLOSURE

L-histidine is prepared by a fermentation process comprising culturing in a suitable nutrient medium a mixture of a microorganism capable of producing L-histidinol and a yeast capable of converting L-histidinol into L-histidine.

---

The present invention relates to a process for preparing L-histidine by fermentation, particularly, it relates to a process which is characterized by culturing a mixture of a microorganism capable of producing L-histidinol and a yeast capable of converting L-histidinol into L-histidine in a culture medium containing carbon source, nitrogen source, inorganic substance and organic nutrients, accumulating a substantial amount of L-histidine and recovering the accumulated L-histidine from the fermentation liquor.

An object of the present invention is to provide an improved process for preparing L-histidine.

Another object of the invention is to provide a commercial process for preparing L-histidine which involves the direct accumulation of a substantial amount of L-histidine in fermentation medium.

L-histidine, one of the protein-composing amino acids, is important for living bodies so that it has been used as medicament, additive to cattle feed stuffs or additive to foodstuffs.

It has already been reported that L-histidine can be accumulated by culturing microorganisms such as the reagent-resisting mutants of *Escherichia coli* and *Salmonella typhimurium* [Science, 129, 968 (1959) and Genetics, 50, 611 (1964)]. However, the accumulated amount of L-histidine in medium is low so that such processes cannot be applicable to commercial preparation of L-histidine.

We have discovered that certain mutants of genus Corynebacterium are capable of accumulating a substantial amount of L-histidinol in culture medium. We have further found that when a mixture of a L-histidinol-producing microorganism and a yeast, for example, Torulopsis, is cultured in a culture medium, which is designed for the production of L-histidinol, a substantial amount of L-histidine is simultaneously accumulated in the medium, which can easily be recovered owing to the presence of little amount of other amino acids byproduced.

As the L-histidinol-producing microorganism which may be used for the purpose of the present invention, for example, L-histidinol-producing strains of Corynebacterium may be used. In general, they are of L-histidine-requiring nature. Preferable strains are exemplified by *Corynbecterium glutamicum* M-560-No. 126 (ATCC No. 21339) which is available to the public on an unrestricted basis from the American Type Culture Collection, 12301 Parklawn Drive, Rockville, Md. 20852. This microorganism is a nutrient-requiring mutant obtained by treating *Corynebacterium glutamicum* M-560 (ATCC No. 13761) with N-methyl-N'-nitro-N-nitrosoguanidine and which is distinguished from the original strain with respect to the requirement for L-histidine and the productivity of L-histidinol.

*Corynebacterium glutamicum* was initially reported as *Micrococcus glutamicus* in Japanese patent publication No. 8698/1957. But as a result of further study by Kinoshita et al. from microbiological and taxonomical view points, it has recently been concluded in The Journal of General and Applied Microgiology, vol. 18, 279–301 (1967) and other literatures that this strain should be classified into genus Corynebacterium and has been designated as *Corynebacterium glutamicum*. This new name is used in the present description.

On the other hand, typical yeast strains capable of converting L-histidinol into L-histidine which may be used for the purpose of the present invention can be exemplified by Torulopsis No. 942 (ATCC No. 20200) which is available to the public on an unrestricted basis, which has been isolated from molasses by us.

The chemistry of producing L-histidine by culturing the mixture of the above mentioned two microorganisms is not yet clear. However, based upon the passage of the biosynthesis of L-histidine, it can reasonably be assumed the L-histidinol which is produced by an L-histidinol-producing strain belonging to Corynebacterium is converted into L-histidine by L-histidinol dehydrogenase of Torulopsis. L-histidinol dehydrogenase is known and is found throughout various microorganisms. However, we have discovered that microorganisms which are believed to have the L-histidinol dehydrogenase cannot always be capable of converting L-histidinol into L-histidine under conditions for the cultivation of L-histidinol-producing strains with the exception of Torulopsis having the characteristic features, as are shown in Table 1.

TABLE 1

| Microorganisms | Accumulation of— | |
|---|---|---|
| | L-histidinol | L-histidine |
| *Brevibacterium ammoniagenes* | +++ | ± |
| *Serratia marcescens* | +++ | — |
| *Aspergillus niger* | +++ | — |
| *Streptomyces griseus* | +++ | — |
| *Streptomyces ambofaciens* | +++ | — |
| *Streptomyces kelicolor* | +++ | — |
| *Corynebacterium glutamicum* M-560 | +++ | — |
| *Bacillus subtilis* | +++ | — |
| *Saccharomyces cerevisiae* | +++ | — |
| *Achromobacter* | +++ | — |
| Torulopsis No. 942 | — | +++ |

NOTES:
(1). Composition of medium.—glucose, 12 g./dl.; ammonium sulfate, 1.5 g./dl.; ammonium chloride, 0.5 g./dl.; urea, 0.3 g./dl.; $KH_2PO_4$, 0.15 g./dl.; $K_2HPO_4$, 0.05 g./dl.; $MgSO_4 \cdot 7H_2O$, 0.05 g./dl.; $FeSO_4 \cdot 7H_2O$, 0.002 g./dl.; $MnSO_4 \cdot 4H_2O$, 0.002 g./dl.; biotin, 30 µg./l.; $CaCO_3$, 2 g./dl.; peptone, 1 g./dl. and meat extract, 0.5 g./dl. The pH was adjusted to 7.2 with ammonia.
(2). Strain and inoculation time.—*Corynebacterium glutamicum* M-560-No. 126 (ATCC No. 21399) was inoculated at the commencement of the cultivation, and various microorganisms cited in Table 1 were then inoculated after four (4) days' cultivation. The cultivation was continued for additional three (3) days.
(3). Cultivation conditions.—Flask shaking, cultivation temperature 28° C.

It is to be understood that these conditions are not sharply critical and are subject to change by those skilled in the art guided in general by the following information.

In carrying out the process of the invention, it is very important to achieve a good growth of the selected L-histidinol-producing microorganisms for better production of L-histidinol. For this purpose, the medium should contain suitable carbon source, nitrogen source, inorganic substances and organic nutrients.

As the carbon source, one or more of glucose, fructose, galactose, sucrose, maltose, trehalose, cellubiose, arabinose, alcohols, acetic acid, molasses, starch hydrolysate, etc. may be used as a preferable concentration of 5–20 g./dl. in the medium.

As the nitrogen source, at least one member of organic and inorganic compounds such as ammonia, urea, ammonium sulfate, ammonium chloride, ammonium acetate, ammonium citrate, etc. may be used.

As the inorganic substances, hydrochloric acid-, sulfuric acid-, nitric acid- and phosphoric acid-salts of sodium, potassium, manganese, magnesium, calcium, cobalt, nickel, zinc, copper, etc. may be used. Moreover, since L-histindinol-producing microorganisms have characteristic requirement for nutrients, it is necessary to add the required organic nutrients to the medium. Because the production yield of L-histidinol and accordingly, of L-histidine will depend upon the amounts of the added nutrients, it is necessary to add suitable amounts of the nutrients. For example, when the above-mentioned L-histidine-requiring mutants are used, it is preferred to add to L-histidine or L-histidine-containing material in an amount of about 50–3000 μg./ml. calculated as L-histidine. It is furthermore possible to add to the medium a small amount of L-histidinol or of an organic nutrient which is effective on the promotion of L-histidine production, although such additive has no or little effect on the growth of the microorganism. Such organic nutrients can in general be exemplifed by amino acids, vitamins, nucleic acid-relating substances apart from the above-mentioned L-histidine. It is also possible to use natural organic materials such as corn steep liquor, peptone, meat extract, yeast extract, soybean meal hydrolysate, microbial cell hydrolysate, etc. as materials containing nutrients. These various organic nutrients can be used singly or together with others.

The cultivation is carried out under aerobic conditions and at a preferable pH of about 5–9 in the course of the cultivation (especially, 7–9 after the inoculation of Torulopsis). The cultivation temperature is preferably within the range of about 23–40° C. and the cultivation is in general continued for 3–8 days. According to the present invention, a considerable amount of L-histidine can be accumulated by cultivating an L-histidinol-producing strain and a yeast capable of converting L-histidinol into L-histidine, e.g., Torulopsis, both of which are mixed together from the commencement of the cultivation. However, it is preferred to carry out an additional cultivation for 2–3 days after the inoculation of L-histidinol-producing strain.

The following non-limitative example illustrates the invention.

EXAMPLE

A medium containing glucose (4 g./dl.), $KH_2PO_4$ (0.15 g./dl.), $K_2HPO_4$ (0.05 g./dl.), $MgSO_4 \cdot 7H_2O$ (0.05 g./dl.), peptone (1 g./dl.), meat extract (1 g./dl.), yeast extract (0.5 g./dl.) and NaCl (0.3 g./dl.) was adjusted to pH 7.2 with ammonia water and was then inoculated with Corynebacterium glutamicum M–560–No. 126 (ATCC No. 21339). The cultivation was continued for 24 hours with shaking. Torulopsis No. 942 (ATCC No. 20200) was separately inoculated to a simular medium and cultivated for 24 hours with shaking. Both were used as the seed cultures.

A fermentation medium was prepared by adding L-hisidine, meat extract, corn steep liquor, soybean hydrolysate or hydrolysate of microbial cell of glutamic acid fermentation to the basic medium consisting of molasses (12 g./dl.) (as glucose), $(NH_4)_2SO_4$ (2 g./dl.), $KH_2PO_4$ (0.15 g./dl.), $K_2HPO_4$ (0.05 g./dl.), $MgSO_4 \cdot 7H_2O$ (0.05 g./dl.) at the rate shown below and at an adjusted pH of 7.2 (with ammonia water). 10 ml. of the fermentation medium was put into a 250 ml. Erlenmeyer flask and sterilized. 0.5 ml. of the seed culture of Corynebacterium glutamicum M–560–No. 126 (ATCC No. 21339) was inoculated on the medium and cultivated at 28° C. with shaking for four (4) days. After this, 1 ml. of the seed culture of Torulopsis No. 942 (ATCC No. 20200) was inoculated together with adding glucose (2 g./dl.) and urea (0.3 g./dl.). The shaking cultivation was continued for an additional three (3) days to obtain the results as follows (in Table 2).

TABLE 2

| Added material and the amount | A | B |
|---|---|---|
| L-histidine·HCl 350 μg./ml | 6.4 | 8.4 |
| Meat extract: | | |
| 0.2 g./dl | 9.4 | 0.8 |
| 0.2 g./dl. plus L-histidine·HCl 100 μg./ml | 11.3 | 2.3 |
| Corn steep liquor: | | |
| 0.5 g./dl | 4.8 | 0.2 |
| 0.5 g./dl. plus L-histidine·HCl 150 μg./ml | 12.4 | 2.4 |
| Soybean hydrolysate: | | |
| 0.5 g./dl | 5.2 | 2.1 |
| 0.5 g./dl. plus L-histidine·HCl 200 μg./ml | 6.5 | 6.9 |
| Hydrolysate of glutamic acid-producing cell: | | |
| 0.5 g./dl | 5.4 | 1.6 |
| 0.5 g./dl. plus L-histidine·HCl 200 μg./ml | 5.0 | 9.8 |

NOTES:
A = L-histidine accumulation mg./ml. (calculated as L-histidine·HCl).
B = L-histidinol accumulation mg./ml. (calculated as L-histidinol·HCl).

We claim:
1. A process for producing L-histidine by fermentation comprising culturing an L-histidinol-producing bacterium selected from the group consisting of an L-histidine-requiring mutant strain of Corynebacterium glutamicum, together with the yeast Torulopsis, ATCC 20200 in a culture medium containing carbon source, nitrogen source, inorganic materials and organic nutrients and recovering the accumulated L-histidine.

2. The process of claim 1 wherein the L-histidinol-producing bacterium is cultured in the culture medium prior to adding the yeast and cultivation is then continued in the presence of both the bacterim and yeast.

3. The process of claim 1 wherein the L-histidinol-producing bacterium is Corynebacterium glutamicum ATCC No. 21339.

4. A process for producing L-histidine by fermentation comprising first culturing an L-histidinol-producing bacterium selected from the group consisting of an L-histidine-requiring mutant strain of Corynebacterium glutamicum in a culture medium containing carbon source, nitrogen source, inorganic materials and organic nutrients, then adding the yeast Torulopsis ATCC No. 20200 to the medium for further cultivation and recovering the accumulated L-histidine.

5. The process of claim 4 wherein the L-histidinol-producing bacterium is Corynebacterium glutamicum ATCC No. 21339.

References Cited

Cook, The Chemistry and Biology of Yeasts, pp. 474 and 475 (1958).

West et al., Biochemistry 3rd edition, pp. 1112 and 1113 (1961).

ALVIN E. TANENHOLTZ, Primary Examiner

U.S. Cl. X.R.
195—49, 111